(12) United States Patent
Hudd

(10) Patent No.: US 9,175,802 B2
(45) Date of Patent: Nov. 3, 2015

(54) SUPPORT FOR USE WITH COMPUTER DEVICES

(71) Applicant: Fellowes, Inc., Itasca, IL (US)

(72) Inventor: Marcus Hudd, Doncaster (GB)

(73) Assignee: FELLOWES, INC., Itasca, IL (US)

( * ) Notice: Subject to any disclaimer, the term of this patent is extended or adjusted under 35 U.S.C. 154(b) by 106 days.

(21) Appl. No.: 14/038,206

(22) Filed: Sep. 26, 2013

(65) Prior Publication Data

US 2014/0083336 A1 Mar. 27, 2014

Related U.S. Application Data

(60) Provisional application No. 61/705,866, filed on Sep. 26, 2012.

(51) Int. Cl.
*A47B 21/03* (2006.01)
*F16M 13/00* (2006.01)
*A47B 23/00* (2006.01)
*G06F 3/039* (2013.01)

(52) U.S. Cl.
CPC ............ *F16M 13/00* (2013.01); *A47B 21/0371* (2013.01); *A47B 23/002* (2013.01); *G06F 3/0395* (2013.01); *A47B 2021/0385* (2013.01)

(58) Field of Classification Search
CPC .................... A47B 21/0371; A47B 2021/0385
See application file for complete search history.

(56) References Cited

U.S. PATENT DOCUMENTS

| | | | | | |
|---|---|---|---|---|---|
| 2,084,373 | A | * | 6/1937 | Anderson | 74/594.4 |
| 2,851,744 | A | * | 9/1958 | Oehmig | 49/469 |
| 3,063,689 | A | * | 11/1962 | Coppock | 239/602 |
| 5,203,527 | A | * | 4/1993 | Rubey | 248/118 |
| 5,467,952 | A | * | 11/1995 | Martin | 248/118.1 |
| 5,566,913 | A | | 10/1996 | Prokop | |
| 5,911,397 | A | | 6/1999 | Jokinen | |
| 6,050,964 | A | * | 4/2000 | Yates | 602/5 |
| 2007/0114341 | A1 | * | 5/2007 | Raftery | 248/118 |

FOREIGN PATENT DOCUMENTS

DE 19952277 A1 5/2001

OTHER PUBLICATIONS

International Search Report and Written Opinion of PCT/US2013/061975, mailed Jan. 9, 2014, 10 pages.
International Preliminary Report on Patentability issued on Sep. 12, 2014 in International Application PCT/US2013/061975.

\* cited by examiner

*Primary Examiner* — Gary Hoge
(74) *Attorney, Agent, or Firm* — Pillsbury Winthrop Shaw Pittman LLP

(57) ABSTRACT

A support is provided for use with computer devices. The support is made of a flexible material and incorporates an oval axial cross-section along with curved inner walls to provide a cushion. The support may be placed adjacent to a computer keyboard or mouse to function as a wrist rest. Additionally, the support may be used as supporting legs on a lap desk.

20 Claims, 6 Drawing Sheets

SUPPORT FOR USE WITH COMPUTER DEVICES

CROSS-REFERENCE TO RELATED APPLICATIONS

This application claims the benefit of Provisional Patent Application No. 61/705,866, filed on Sep. 26, 2012, the disclosure of which is incorporated by reference herein in its entirety.

BACKGROUND OF THE INVENTION

1. Field of Invention

The present invention is generally related to a support. More specifically, the invention relates to a flexible support that provides cushioning when using computer devices.

2. Background

Computer devices are used in many aspects of everyday life. A variety of accessories have been made for use with these computer devices. One such product is a wrist rest. The wrist rest provides elevation and support for the wrists when using a keyboard or mouse. Wrist rests commonly used today typically comprise a strip of foam rubber or gel pad. Another product is a lap desk. Lap desks are used to support a laptop computer or other computer device, typically at an angle.

With computer devices continuing to become more prominent, a need exists for a better product for use with these computer devices.

SUMMARY OF THE INVENTION

The present invention provides a flexible support that incorporates novel geometries and structural elements to offer a cushion for use with various computer devices and related peripherals.

One aspect of the invention provides a support. The support is generally elliptical in shaped. The support is mostly hollow with the exception of two curved interior walls.

In an embodiment, the support is used as a wrist rest with computer keyboard or laptop. The support is long enough to span the length of the keyboard.

In another embodiment, the support is used as a wrist rest while using a computer mouse. The wrist rest may be connected to a mouse pad.

In yet another embodiment the support is used as legs for a lap desk.

Other features and advantages of the present invention will become apparent from the following detailed description, the accompanying drawings, and the appended claims.

The figures illustrate embodiments of various aspects of the inventions claimed. These embodiments are in no way intended to be limiting, and are intended only as an example for facilitating an understanding of the principles of the claimed inventions.

DETAILED DESCRIPTION OF THE ILLUSTRATED EMBODIMENT(S)

Embodiments of the invention provide a support for use with computer devices and related peripherals. The support is made of flexible material and utilizes an oval cross-sectional geometry and curved interior walls to provide the stability to function as a cushion or leg.

Figure 1:
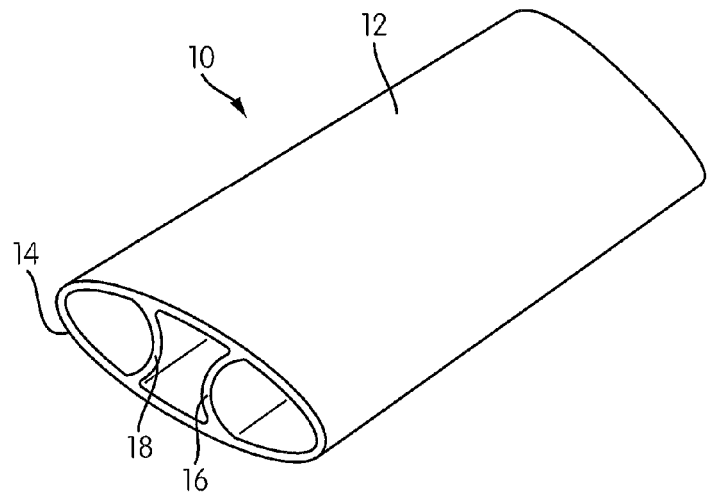
FIG. 1 is a perspective view of a portion of a support according to an embodiment of the invention.

Turning to FIG. 1, an end portion of a support 10 is shown. The exterior perimeter of support 10 is made up of exterior walls 12, 14. Exterior walls 12, 14 are curved pieces and are formed or joined together. Exterior walls 12, 14 produce a hollow interior space having an oval or elliptical cross-section. The oval shape allows support 10 to pivot forwards and backwards in a rocking motion during use. The thickness of exterior walls 12, 14 are formed to provide the desired flexibility and stability on the basis of need and use. In one embodiment, the thickness of exterior walls 12, 14 is between 0.01 to 0.25 inch. Preferably, the thickness of exterior walls 12, 14 is about 0.08 inch. The radii of support 10 are also set to provide the desired flexibility and stability on the basis of need and use. Changing the radii of support 10 changes the cross sectional shape of support 10. Increasing the length of the major axis would result in a more oblong oval shape, while increasing the length of the minor axis would result in a more circular shape. In one embodiment, the diameter as measured along the major axis is between 2.25 to 2.75 inches. Preferably, the diameter as measured along the major axis is about 2.55 inches. In one embodiment, the diameter as measured along the minor axis is between 0.75 to 1.25 inches. Preferably, the diameter as measured along the minor axis is about 0.9 inch.

Support 10 further includes interior walls 16, 18 disposed within the space formed by exterior walls 12, 14. Interior walls 16, 18 extend between exterior walls 12, 14 to resiliently support the exterior wall that is on top (i.e., exterior wall 12 in FIG. 1). Interior walls 16, 18 are curved walls wherein the convex side of the walls faces towards the central longitudinal axis of support 10 (and towards one another). Likewise, the concave sides face away from the central longitudinal axis and each other. The thickness of interior walls 16, 18 may be formed to provide the desired flexibility and stability on the basis of need and use. In addition, the curvature of interior walls 16, 18 may be set to provide the desired flexibility and stability on the basis of need and use. In one embodiment, the thickness of inner walls 16, 18 is between 0.01 to 0.25 inch. Preferably, the thickness of interior walls 16, 18 is about 0.08 inch.

Support 10 may be formed from a resilient material such as silicone rubber. Material such as silicone rubber provides flexibility to support 10 and also has the added benefit of being easy to clean and disinfect. Non-porous/non-fabric materials are generally preferred for these reasons. Support 10 may be formed as one integral piece or as several pieces joined together. Support 10 may be formed through molding, extrusion, or other manufacturing methods. The cross-section of support 10 may be the same along its entire length. The ends may optionally be capped to prevent ingress of unwanted materials.

Figure 2:
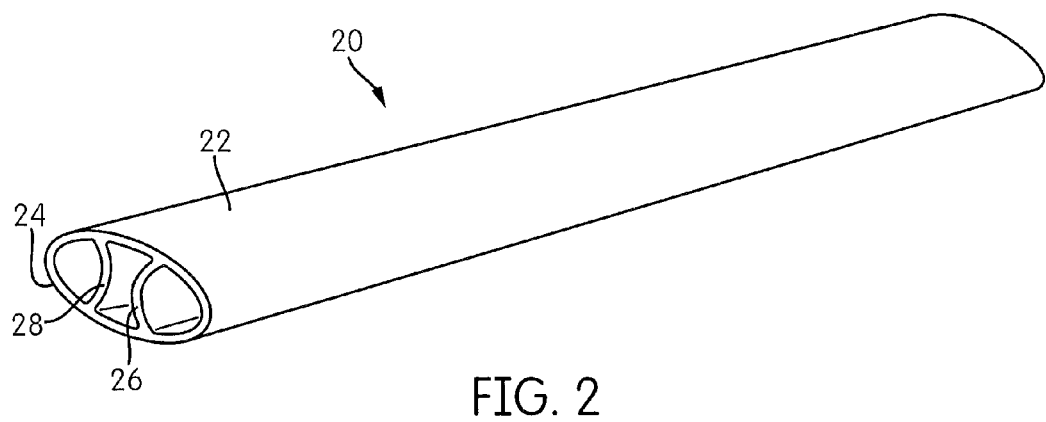
FIG. 2 is a perspective view of a support for use as a wrist rest with a computer keyboard according to an embodiment of the invention.

FIG. 2 shows a support 20 according to one embodiment. Support 20 is similar to the portion of support 10 shown in FIG. 1. Support 20 includes exterior walls 22, 24 and interior walls 26, 28. As described above with regards to support 10, the thickness and shape of exterior walls 22, 24 and the thickness and curvature of interior walls 26, 28 may be formed to provide the desired flexibility and stability on the basis of need and use. The dimensions described above for the interior and exterior walls of support 10 may be used with support 20.

One preferred use for support 20 is as a wrist rest. In particular, support 20 may be used as a wrist rest in conjunction with a computer keyboard or laptop. Support 20 may be placed adjacent to the keyboard, thereby providing an elevated cushion for a user's wrist area. When pressure is placed on support 20 by the user's weight, support 20 deforms in a substantially uniform manner under the pressure and acts as a cushion. Support 20 may pivot forwards and backwards in a rocking motion when in use. The rocking motion allows the user's wrist and arms to move in a more natural motion as compared to a static wrist rest. When not in use, the major axis of support 20 is substantially parallel to a surface that support 20 is resting on. Based on the dimensions of a typical keyboard, support 20 may be between 17 to 19 inches long, and preferably between 18 and 18.5 inches long.

Figure 3:
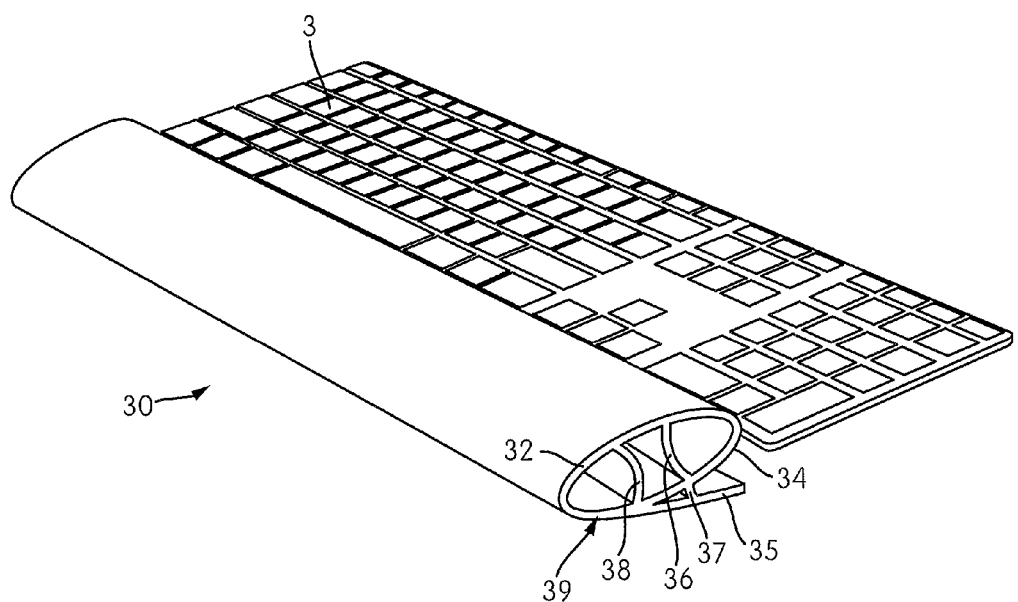
FIG. 3 is a perspective view of a support for use as a wrist rest with a keyboard according to another embodiment of the invention.

FIG. 3 shows support 30 according to an embodiment of the invention. Similar to support 20 as shown in FIG. 2, support 30 may be used as a wrist rest in conjunction with a computer keyboard or laptop. Support 30 is shown adjacent to keyboard 3. Based on the dimensions of a typical keyboard, support 30 may be between 17 to 19 inches long, and preferably between 18 and 18.5 inches long.

Support 30 includes exterior walls 32, 34 and interior walls 36, 38. As described above with regards to supports 10 and 20, the thickness and shape of exterior walls 32, 34 and the thickness and curvature of interior walls 36, 38 may be formed the desired flexibility and stability on the basis of need and use. The dimensions described above for the interior and exterior walls of supports 10 and 20 may be used with support 30.

Support 30 additionally includes a panel 35 partially attached to exterior wall 34 as shown in FIG. 3 as region 39. Panel 35 is a substantially flat piece that engages a support surface. In one embodiment, the thickness of panel 35 is between 0.01 to 0.25 inch. Preferably, the thickness of panel 35 is about 0.125 inch. An additional wall 37 may be added extending between exterior wall 34 and panel 35 at a position spaced from the center axis to provide additional support and orient the support 30 at an angle as discussed below. In one embodiment, the thickness of wall 37 is between 0.01 to 0.25 inch. Preferably, the thickness of wall 37 is about 0.08 inch.

The oval portion of support 30 formed by exterior walls 32, 34 is angled upwards from a surface that support 30 is resting on. That is, the major axis of the oval or ellipse formed by exterior walls 32, 34 forms an acute angle with the surface. Wall 37 provides the additional support. Support 30 may pivot forwards and backwards in a rocking motion when in use. If wall 37 is used, it may flex as well to accommodate the movement of the support 30. Support 30 may be formed as one integral piece or as multiple pieces joined together.

Figure 4A:
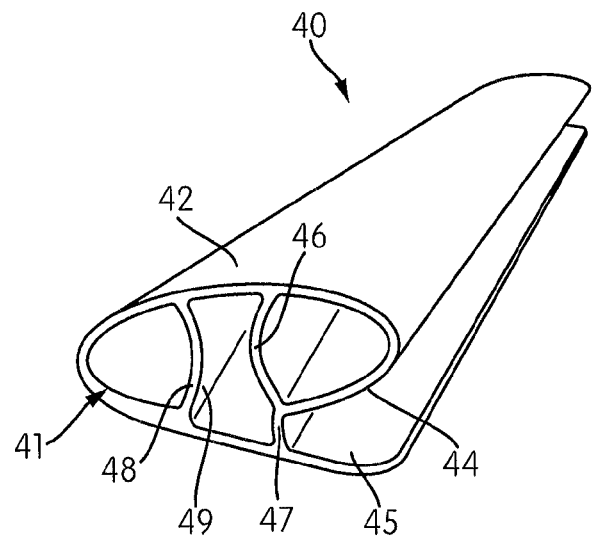
FIG. 4A is a perspective view of a support for use as a wrist rest with a keyboard according to yet another embodiment of the invention.
Figure 4B:
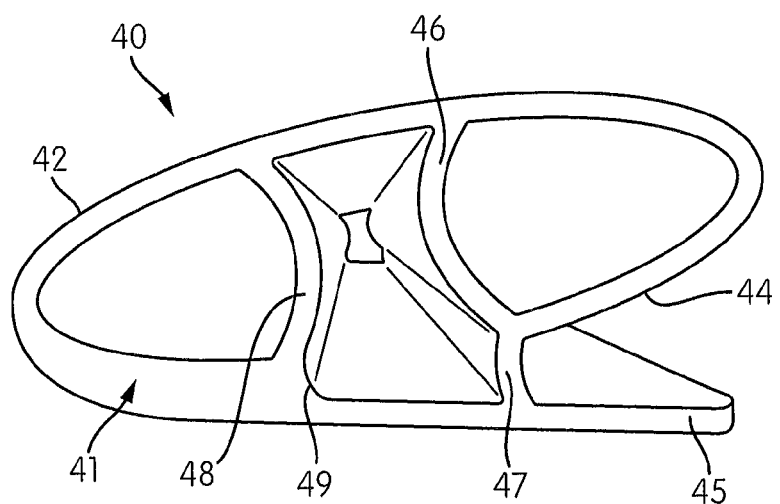
FIG. 4B is a view of the cross-section of the wrist rest shown in FIG. 4A.

FIG. 4A shows support 40 according to an embodiment of the invention. FIG. 4B shows the radial cross-section of support 40. Similar to supports 20 and 30, support 40 may be used as a wrist rest in conjunction with a computer keyboard or laptop. Based on the dimensions of a typical keyboard, support 40 may be between 17 to 19 inches long, and preferably between 18 and 18.5 inches long.

Support 40 includes exterior walls 42, 44 and interior walls 46, 48. As described above with regards to supports 10, 20, and 30, the thickness and shape of exterior walls 42, 44 and the thickness and curvature of interior walls 46, 48 may be formed to provide the desired flexibility and stability on the basis of need and use. The dimensions described above for the interior and exterior walls of supports 10, 20, and 30 may be used with support 40.

Support 40 additionally includes a panel 45 partially attached to exterior wall 44 as shown in FIG. 4 as region 41. Panel 45 is a substantially flat piece that engages the surface that support 40 rests on. In one embodiment, the thickness of panel 45 is between 0.01 to 0.25 inch. Preferably, the thickness of panel 45 is about 0.125 inch.

As shown in FIG. 4B, exterior wall 44 does not form a complete ellipse with exterior wall 42, but still is seen as substantially oval in cross-section. The central portion of exterior wall 44 between where interior walls 46 and 48 meet exterior wall 44 is not present. Rather, interior walls 47, 49 extend downwards from the point where interior walls 46 and 48 meet exterior wall 44 to connect with support 45.

The portion of support 40 formed by exterior walls 42, 44 is angled upwards from a surface that support 40 is resting on. Support 40 may pivot forwards and backwards in a rocking motion when in use. Support 40 may be formed as one integral piece or as multiple pieces joined together. This aspect is similar to the embodiment of FIG. 3, discussed above.

As shown in the embodiments illustrated in FIGS. 2-4, variations to the geometry and structural elements of a support according to the invention may be made without departing from the spirit of the invention. Reasons for variations may include manufacturing considerations. All embodiments of the support include curved interior walls contained within exterior walls that form a substantially oval cross-sectional shape.

Figure 5:
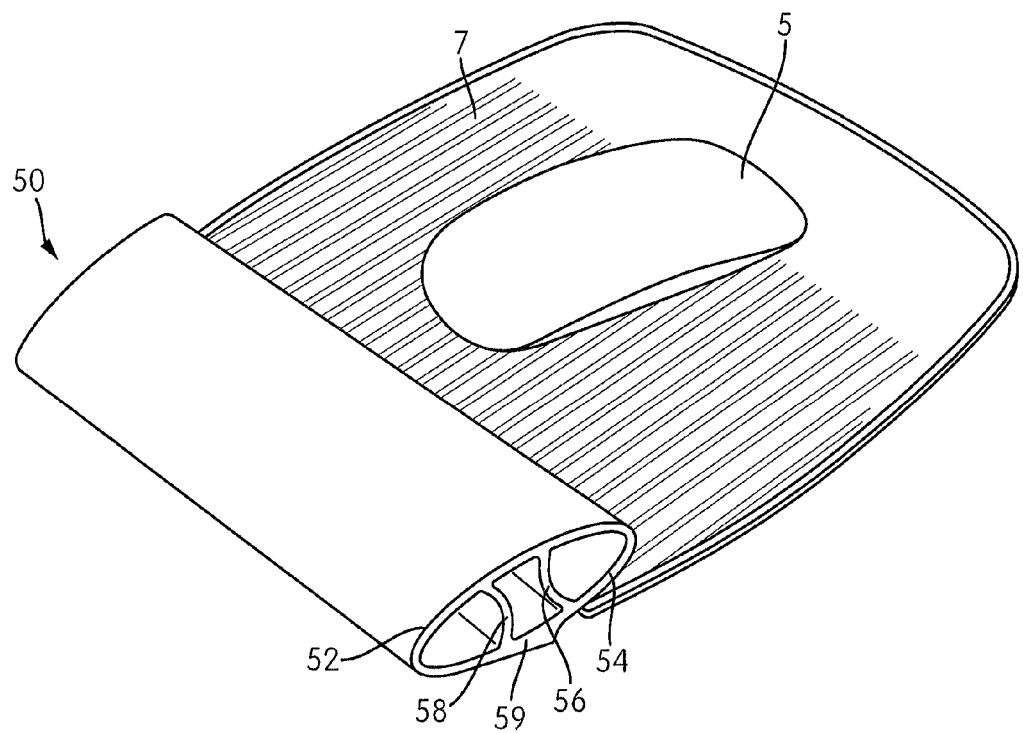
FIG. 5 is a perspective view of a support for use as a wrist rest with a mouse pad according to an embodiment of the invention.
Figure 6:
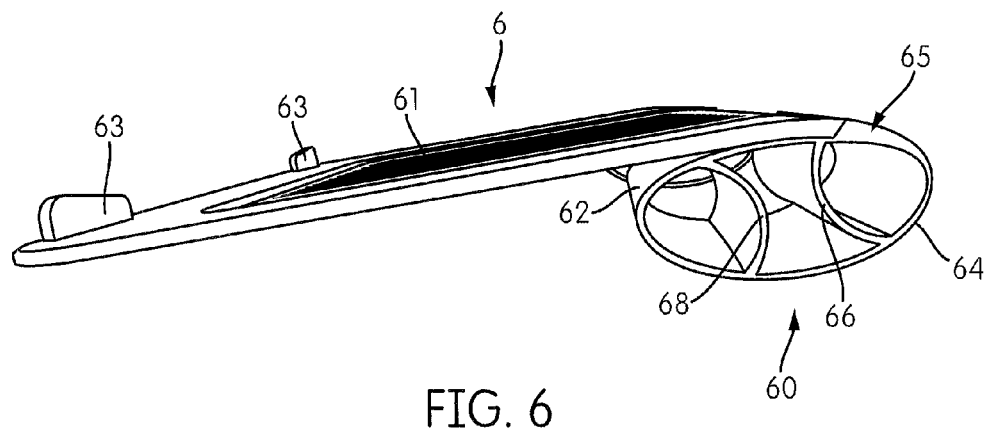
FIG. 6 is a side perspective view of a lap desk with supports according to an embodiment of the invention as legs.
Figure 7:
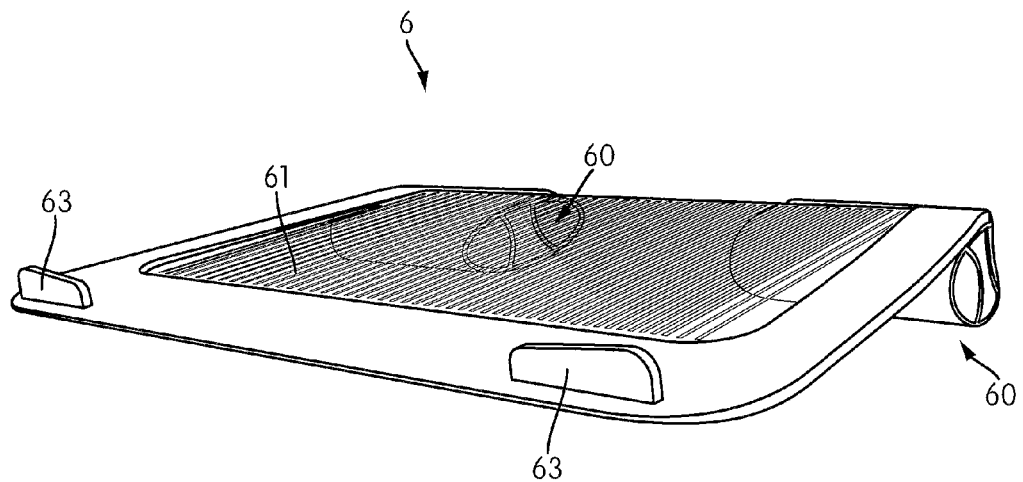
FIG. 7 is a front perspective view of the lap desk of FIG. 6.

Turning to FIG. 5, support 50 according to an embodiment of the invention is shown with a mouse pad 7. Support 50 provides an elevated cushion for a user's wrist area. When pressure is placed on support 50 by the user's weight, support 50 deforms substantially uniformly under the pressure and acts as a cushion.

Mouse pad 7 may be made of any suitable material, such as foam or plastic, for the operation of a mouse 5. Mouse pad 7 may be made into any suitable shape or size. Based on the dimensions of a typical mouse pad, support 50 may be between 6 to 8 inches in length, and preferably about 7 inches in length. Support 50 may be placed adjacent to a mouse pad or a mouse pad may be secured to support 50.

Support 50 includes exterior walls 52, 54 and interior walls 56, 58. As described above with regards to the other embodiments of the support as shown by supports 10, 20, 30, and 40, the thickness and shape of exterior walls 52, 54 and the thickness and curvature of interior walls 56, 58 may be formed to provide the desired flexibility and stability on the basis of need and use. The dimensions described above for the interior and exterior walls of supports 10, 20, 30 and 40 may be used with support 50.

Support 50 additionally includes a wedge 59 attached to a portion of exterior wall 54. Wedge 59 has a substantially flat bottom that engages the surface that support 50 rests on. In one embodiment, wedge 59 is a solid piece. In another embodiment, wedge 59 includes a groove or recess where mouse pad 7 may be inserted into and secured to support 50.

The portion of support 50 formed by exterior walls 52, 54 is angled upwards from a surface that support 50 is resting on. The angular relation is provided by the geometry of the wedge 59. Support 50 may pivot forwards and backwards in a rocking motion when in use. Support 50 may be formed as one integral piece or as multiple pieces joined together.

Turning to FIGS. 6-9, support 60 according to an embodiment is used as legs in a lap desk 6 (also referred to as a lap tray). Lap desk 6 includes panel 61, legs 60, and ledges 63. Lap desk 6 may function as a support for a laptop computer or other electronic devices. Lap desk 6 may be placed on a flat surface such as a desk or may be placed on a user's lap. Panel 61 may be a substantially flat tray or piece and may be made of plastic or metal. Ledges 63 at the bottom edge portion of panel 61 (i.e., opposite/distal support 60) provide support to the electronic device placed on lap desk 6.

The exterior perimeter of support 60 is made up of exterior walls 62, 64. Exterior walls 62, 64 are curved and are formed or joined together to produce an oval or elliptical cross-sectional geometry for support 60. The thickness of exterior walls 62, 64 are formed to provide the desired flexibility and stability on the basis of need and use. In one embodiment, the thickness of exterior walls 62, 64 is between 0.01 to 0.25 inch. Preferably, the thickness of exterior walls 62, 64 is about 0.08 inch. One portion of exterior wall 62 (denoted by reference number 65) may be thicker than the remaining portion of exterior wall 62. Portion 65 may form a ledge where panel 61 may abut. Panel 61 may be secured to exterior wall 62 with glue, tabs that insert into portion 65, or other means.

The radii of support 60 are set to provide the desired flexibility and stability on the basis of need and use. Changing the radii of support 60 changes the cross sectional shape of support 60. Increasing the length of the major axis of support 60 would result in a more oblong oval shape, while increasing the length of the minor axis would result in a more circular shape.

Support 60 further includes interior walls 66, 68. Interior walls 66, 68 extend between exterior walls 62, 64 to resiliently support the exterior wall that is on top (i.e., exterior wall 62 in FIG. 6). Interior walls 66, 68 are curved walls wherein the convex side of the walls faces towards the central longitudinal axis of support 60 (and towards one another). Likewise, the concave sides face away from the central longitudinal axis and each other. The thickness of interior walls 16, 18 may be formed to provide the desired flexibility and stability on the basis of need and use. In addition, the curvature of interior walls 66, 68 may be set to provide the desired flexibility and stability on the basis of need and use.

Support 60 may be formed from a resilient material such as silicone rubber. Support 60 may be formed as one integral piece or as several pieces joined together. Support 60 may be formed through molding, extrusion, or other manufacturing methods. The cross-section of support 60 may be the same along its entire axial length. The ends may optionally be capped to prevent ingress of unwanted materials.

Figure 8:
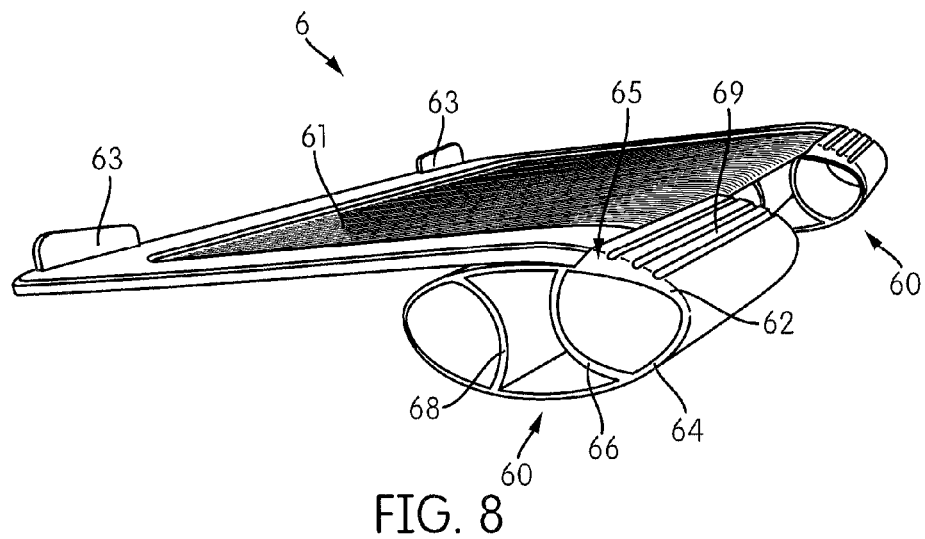
FIG. 8 is a back perspective view of the lap desk of FIG. 6.
Figure 9:
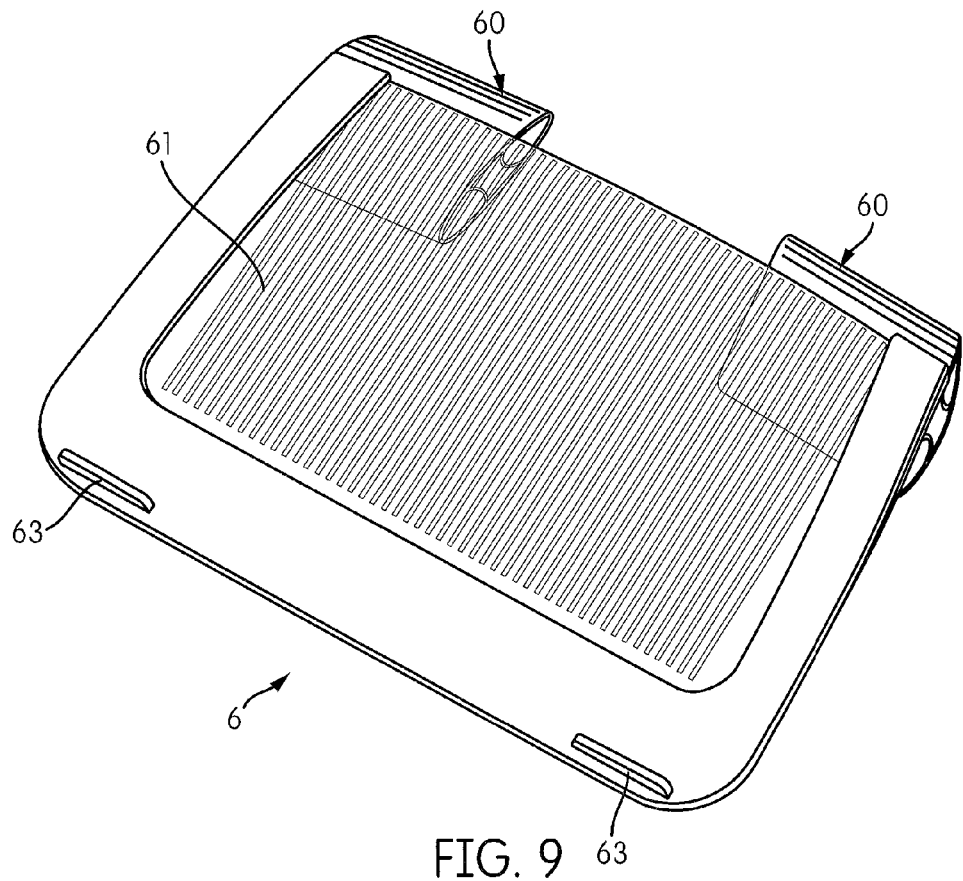
FIG. 9 is top perspective view of the lap desk of FIG. 6.

Lap desk 6 is shown in FIGS. 6-9 with two supports 60 spaced apart from one another as legs. In other embodiments, more than two supports 60 may be used. In other embodiments, support 60 may be lengthened such that only one support 60 is needed to function as a leg for lap desk 6. Other modifications may be made to support 60. For example, FIG. 8 shows longitudinal grooves on portion 65 of exterior wall 62.

The foregoing illustrated embodiments have been provided solely for illustrating the structural and functional principles of the present invention and are not intended to be limiting. Thus, the present invention is intended to encompass all modifications, substitutions, alterations, and equivalents.

What is claimed is:

1. A support comprising:
   a resilient enclosure having a substantially oval cross-sectional shape with a first longitudinally extending top side and a second longitudinally extending bottom side;
   a first and a second resilient wall disposed within the enclosure and extending between the top side and the bottom side to resiliently support the top side; and
   a flat panel extending from the bottom side to engage a support surface.

2. The support of claim 1, wherein the first and second walls are curved with a convex side of the walls facing towards a central longitudinal axis of the support.

3. The support of claim 1, wherein the flat panel is at least partially attached to the second longitudinally extending bottom side such that a major axis of the resilient enclosure forms an acute angle with the support surface.

4. The support of claim 1, wherein the support is formed as one integral piece.

5. The support of claim 1, wherein the support is made of silicone rubber.

6. The support of claim 1, wherein a length of the support is between 6 to 8 inches.

7. The support of claim 6, wherein the support is attached to a mouse pad.

8. A wrist rest comprising:
   a resilient enclosure having a substantially oval cross-sectional shape with a first longitudinally extending top side and a second longitudinally extending bottom side; and
   a first and a second resilient wall disposed within the enclosure and extending between the top side and the bottom side to resiliently support the top side,
   wherein the wrist rest is attached to a mouse pad.

9. The wrist rest of claim 8, wherein the first and second walls are curved with a convex side of the walls facing towards a central longitudinal axis of the support.

10. The wrist rest of claim 8, wherein the wrist rest is made of silicone rubber.

11. The wrist rest of claim 8, wherein the wrist rest is formed as one integral piece.

12. The wrist rest of claim 8, further comprising a flat panel extending from the bottom side to engage a support surface.

13. The wrist rest of claim 12, wherein the flat panel is at least partially attached to the second longitudinally extending bottom side such that a major axis of the resilient enclosure forms an acute angle with the support surface.

14. The wrist rest of claim 8, wherein a length of the wrist rest is between 6 to 8 inches.

15. A support comprising:
   a resilient enclosure having a substantially oval cross-sectional shape with a first longitudinally extending top side and a second longitudinally extending bottom side; and
   a first and a second resilient wall disposed within the enclosure and extending between the top side and the bottom side to resiliently support the top side,
   wherein the length of the support is between 6 to 8 inches, and
   wherein the support is attached to a mouse pad.

16. The support of claim 15, wherein the first and second walls are curved with a convex side of the walls facing towards a central longitudinal axis of the support.

17. The support of claim 15, further comprising a flat panel extending from the bottom side to engage a support surface.

18. The support of claim 17, wherein the flat panel is at least partially attached to the second longitudinally extending bottom side such that a major axis of the resilient enclosure forms an acute angle with the support surface.

19. The support of claim 15, wherein the support is formed as one integral piece.

20. The support of claim 15, wherein the support is made of silicone rubber.

\* \* \* \* \*